United States Patent
Vining et al.

(10) Patent No.: US 12,102,917 B2
(45) Date of Patent: Oct. 1, 2024

(54) VARIABLE END-POINT USER INTERFACE RENDERING

(71) Applicant: GOOGLE LLC, Mountain View, CA (US)

(72) Inventors: Nicholas Vining, Kitchener (CA); Paul LaLonde, Kitchener (CA)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 17/433,973

(22) PCT Filed: Feb. 25, 2019

(86) PCT No.: PCT/US2019/019440
§ 371 (c)(1),
(2) Date: Aug. 25, 2021

(87) PCT Pub. No.: WO2020/176070
PCT Pub. Date: Sep. 3, 2020

(65) Prior Publication Data
US 2022/0134227 A1    May 5, 2022

(51) Int. Cl.
*A63F 13/537* (2014.01)
*H04N 21/2343* (2011.01)
(Continued)

(52) U.S. Cl.
CPC ... *A63F 13/537* (2014.09); *H04N 21/234363* (2013.01); *H04N 21/4312* (2013.01); *H04N 21/6547* (2013.01)

(58) Field of Classification Search
None
See application file for complete search history.

(56) References Cited

U.S. PATENT DOCUMENTS

| 6,577,311 B1* | 6/2003 | Crosby | G06F 16/9577 |
| | | | 345/428 |
| 7,522,664 B1* | 4/2009 | Bhaskar | G01N 21/9501 |
| | | | 348/126 |

(Continued)

FOREIGN PATENT DOCUMENTS

| CN | 105050671 A | 11/2015 |
| EP | 2 713 625 A1 | 4/2014 |

(Continued)

OTHER PUBLICATIONS

PCT International Search Report and Written Opinion for International Application No. PCT/US2019/019440, mailed May 28, 2019, 19 pages.

(Continued)

*Primary Examiner* — Seng H Lim
(74) *Attorney, Agent, or Firm* — Lowenstein Sandler LLP (57) ABSTRACT

Methods and systems for rendering distinct components of a combined user interface (UI) are described herein. A processing device receives a user request for a media item to be presented via a combined UI including one or more video content components and one or more UI control components. The processing device generates a rendering of the video content components and transmits a first stream including the rendering of the video content components to an endpoint device, wherein the first stream is encoded to a first resolution and wherein the rendering of the video content components is to be merged with a rendering of the UI control components into the combined UI at the endpoint device, the combined UI having a second resolution.

17 Claims, 5 Drawing Sheets

(51) Int. Cl.
  *H04N 21/431* (2011.01)
  *H04N 21/6547* (2011.01)

(56) References Cited

U.S. PATENT DOCUMENTS

| | | | | |
|---|---|---|---|---|
| 8,506,402 | B2* | 8/2013 | Gault | A63F 13/35 |
| | | | | 463/40 |
| 8,745,173 | B1 | 6/2014 | Tidd | |
| 9,736,442 | B1* | 8/2017 | Wong | H04N 9/3147 |
| 10,159,901 | B2 | 12/2018 | Justice et al. | |
| 11,012,694 | B2* | 5/2021 | Dimitrov | G06F 9/4856 |
| 11,612,812 | B1* | 3/2023 | Gangwal | H04N 7/0125 |
| | | | | 463/42 |
| 11,617,946 | B1* | 4/2023 | Gangwal | A63F 13/655 |
| | | | | 463/42 |
| 2003/0026588 | A1* | 2/2003 | Elder | H04N 7/18 |
| | | | | 386/230 |
| 2007/0024705 | A1* | 2/2007 | Richter | H04N 21/6587 |
| | | | | 348/E7.086 |
| 2010/0177162 | A1* | 7/2010 | Macfarlane | H04N 13/194 |
| | | | | 348/E13.001 |
| 2010/0304860 | A1* | 12/2010 | Gault | G06F 9/45558 |
| | | | | 463/31 |
| 2012/0110628 | A1* | 5/2012 | Candelore | H04N 21/4621 |
| | | | | 725/116 |
| 2013/0204927 | A1 | 8/2013 | Kruglikov et al. | |
| 2014/0289627 | A1 | 9/2014 | Brockmann et al. | |
| 2015/0020135 | A1* | 1/2015 | Frusina | H04N 21/2405 |
| | | | | 725/116 |
| 2015/0181152 | A1* | 6/2015 | Holbrook | H04N 21/4882 |
| | | | | 348/564 |
| 2016/0182594 | A1* | 6/2016 | White | H04L 65/61 |
| | | | | 709/219 |
| 2016/0316174 | A1* | 10/2016 | Whynot | H04L 65/80 |
| 2017/0353765 | A1* | 12/2017 | Frusina | H04N 21/6175 |
| 2019/0073747 | A1* | 3/2019 | Burch | G06T 15/04 |
| 2019/0118098 | A1* | 4/2019 | Payzer | A63F 13/77 |
| 2019/0222897 | A1* | 7/2019 | Frusina | H04N 21/234363 |
| 2020/0169766 | A1* | 5/2020 | Chirokov | H04N 21/816 |
| 2023/0111865 | A1* | 4/2023 | Qian | G06T 7/248 |
| | | | | 382/107 |
| 2023/0196503 | A1* | 6/2023 | Brasnett | H04N 19/33 |
| | | | | 375/240 |
| 2023/0262234 | A1* | 8/2023 | Amini | H04B 17/318 |
| | | | | 709/219 |

FOREIGN PATENT DOCUMENTS

| | | |
|---|---|---|
| EP | 3 050 302 | 8/2016 |
| JP | 2016-530778 A | 9/2016 |
| JP | 2018-514013 A | 5/2018 |
| JP | 2018-533288 A | 11/2018 |
| KR | 20020064888 A | 8/2002 |
| KR | 10-2008-0087031 A | 9/2018 |
| KR | 20190005253 A | 1/2019 |

OTHER PUBLICATIONS

International Preliminary Report on Patentability of International Application No. PCT/US2019/019440 mailed May 18, 2021, 10 pages.

Yu-Jung Chen et al: "Distributed rendering: Interaction delay reduction in remote rendering with client-end GPU-accelerated scene warping technique", 2017 IEEE International Conference on Multimedia & Expo Workshops (ICMEW), IEEE, Jul. 10, 2017 (Jul. 10, 2017), pp. 67-72, XP033148333, DOI: 10.1109/ICMEW.2017. 8026271.

Chuah Seong-Ping et al: "Cloud gaming: a green solution to massive multi player on line games", Technical Report of Wireless Networking Group, Coordinated Science Laboratory; Dept. Electrical and Computer Engineering; University of Illinois at Urbana-Champaign, US, vol. 21, No. 4, Aug. 1, 2014 (Aug. 1, 2014), pp. 78-87, XP011557564, ISSN: 1536-1284, DOI: 10.1109/MWC.2014. 6882299.

Xu Chanchan et al: "Remote Rendering for Mobile Devices Literature Overview", Jun. 4, 2016 (Jun. 4, 2016), Image Analysis and Recognition: 11th International Conference, ICIAR 2014, Vilamoura, Portugal, Oct. 22-24, 2014, Proceedings, Part I; In: Lecture Notes in Computer Science, ISSN 1611-3349 ; vol. 8814; [Lecture Notes in Computer Science; Lect.No. XP047346395, ISBN: 978-3-642-17318-9.

Peter Eisert, Philipp Fechteler, "Remote rendering of computer games", Jan. 2007, 6 pages, Fraunhofer Institute for Telecommunications, Einsteinufer 37, D-10587 Berlin, Germany.

Chinese Office Action for Application No. 201980092552.0 dated Nov. 21, 2022, 19 pages.

India Office Action for Application No. 202147042437 dated Mar. 11, 2022, 6 pages.

Korean Office Action for Application No. 10-2021-7030285 dated Oct. 28, 2022, 15 pages.

Ivan Slivar; Zvonimir Dragozet; Lea Skorin-Kapov, User customization of the GamingAnywhere Android mobile client interface, Dec. 3, 2015 International Workshop on Network and Systems Support for Games (NetGames), 米国, IEEE, Dec. 3, 2015, https://ieeexplore. ieee.org/stamp/stamp.jsp?tp=&arnumber=7383003.

* cited by examiner

VARIABLE END-POINT USER INTERFACE RENDERING

TECHNICAL FIELD

Aspects of the present disclosure generally relate to user interface rendering and more specifically to separately rendering distinct components of a combined user interface.

BACKGROUND

Streamed content may be presented on a user device via a user interface (UI). The UI may include a video content component and a UI control component. For example, a UI for an online game may include a gameplay component presenting live content of the game and a game control component presenting information about the game and providing controls that allow game viewers and/or participants to interact with the game.

Typically, the video content component and the UI control component of the streamed content UI are rendered together at a server to create one video stream, which is then encoded at one resolution and transmitted to the user device. The resolution used for encoding is usually a maximum resolution supported by the user device (e.g., 4096×4096).

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to some aspects of the present disclosure, a method is provided that includes receiving, at a server, a user request for a media item to be presented via a combined user interface (UI) including one or more video content components and one or more UI control components; generating a rendering of the video content components; and transmitting a first stream including the rendering of the video content components to an endpoint device, wherein the first stream is encoded to a first resolution and wherein the rendering of the video content components is to be merged with a rendering of the UI control components into the combined UI at the endpoint device, the combined UI having a second resolution.

According to other aspects of the present disclosure, a method is provided that includes receiving, at a server, a user request for a media item to be presented via a combined user interface (UI) including one or more video content components and one or more UI control components; generating a rendering of the video content components; transmitting a first stream including the rendering of the video content components to an endpoint device, wherein the first stream is encoded to a first resolution; determining whether to generate a rendering of the UI control components at the server or at the endpoint device; responsive to determining to generate the rendering of the UI control components at the endpoint device, transmitting a set of commands for rendering the UI control components to the endpoint device via a network, the rendering of the UI control components having the first resolution or a second resolution; and responsive to determining to generate the rendering of the UI control components at the server: executing, at the server, the set of commands for rendering the UI control components to generate the rendering of the UI control components, and transmitting a second stream including the rendering of the UI control components to the endpoint device.

Optionally, the method may include executing, at the server, a set of commands to generate the rendering of the UI control components and transmitting a second stream including the rendering of the UI control components to the endpoint device, the second stream being encoded to the second resolution. The method may include transmitting a set of commands for rendering the UI control components to the endpoint device to generate the rendering of the UI control components at the endpoint device at the second resolution. The method may include determining whether to generate a rendering of the UI control components at the server or at the endpoint device; responsive to determining to generate the rendering of the UI control components at the endpoint device, transmitting a set of commands for rendering the UI control components to the endpoint device via a network, the rendering of the UI control components having the second resolution; and responsive to determining to generate the rendering of the UI control components at the server, executing, at the server, the set of commands for rendering the UI control components to generate the rendering of the UI control components and transmitting a second stream including the rendering of the UI control components to the endpoint device. The second resolution may be higher than the first resolution and the rendering of the video content component may be modified to match the second resolution of the UI control components at the endpoint device. The determination of whether to execute the set of commands at the server or at the endpoint device may be based on at least one of: a hardware capability of the endpoint device, a resolution of the endpoint device, a target resolution of the combined UI, a rendering capability of the server, or a bandwidth available on the network. The combined UI may present an online game via the video content components, and present info nation about the game and receive user input pertaining to the game via the UI control components.

According to some aspects of the present disclosure, a system is provided that includes a memory and a processing device coupled to the memory. The processing device is configured to: receive a user request for a media item to be presented via a combined UI including one or more video content components and one or more UI control components; generate a rendering of the video content components; and transmit a first stream including the rendering of the video content components to an endpoint device, wherein the first stream is encoded to a first resolution and wherein the rendering of the video content components is to be merged with a rendering of the UI control components into the combined UI at the endpoint device, the combined UI having a second resolution.

According to other aspects of the present disclosure, a system is provided that includes a memory and a processing device coupled to the memory. The processing device is configured to: receive a user request for a media item to be presented via a combined user interface (UI) including one or more video content components and one or more UI control components; generate a rendering of the video content components; transmit a first stream including the rendering of the video content components to an endpoint device, wherein the first stream is encoded to a first resolution; determining whether to generate a rendering of the UI control components at a server or at the endpoint device;

responsive to determining to generate the rendering of the UI control components at the endpoint device, transmitting a set of commands for rendering the UI control components to the endpoint device via a network, the rendering of the UI control components having the first resolution or a second resolution; and responsive to determining to generate the rendering of the UI control components at the server: executing, at the server, the set of commands for rendering the UI control components to generate the rendering of the UI control components, and transmitting a second stream including the rendering of the UI control components to the endpoint device.

According to some aspects of the present disclosure, a computer readable medium is provided that includes instructions, which when executed by a processing device, cause the processing device to perform the method described above.

The individual features and/or combinations of features defined above in accordance with any aspect of the present disclosure or below in relation to any specific embodiments may be utilized, either separately and individually, alone or in combination with any other defined feature, in any other aspect or embodiment. Further, the present disclosure is intended to cover apparatus configured to perform any feature described herein in relation to a method and/or a method of using or producing, using or manufacturing any apparatus feature described herein.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to have the same embodiment, and such references mean at least one.

DETAILED DESCRIPTION

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

A technical problem addressed by implementations of the disclosure is that streaming content to an endpoint device may require a large amount of network bandwidth. For example, if content is streaming to an endpoint device with a 4K resolution, a large amount of network bandwidth may be used to transmit the content stream at a resolution high enough to ensure a crisp display of the content for the user. If the content is transmitted to the endpoint device at a lower resolution, portions of the streamed content may not be crisp and the user may not fully enjoy the viewing experience. As such, achieving a compromise between resolution and demand on the network (e.g., required bandwidth) may be required.

Streamed content may be presented via a UI that may include multiple components (UI components of different types). The multiple components may not need to be streamed at the same resolution to ensure a crisp display of the overall content for the user because the user's perception of those components may be different. For example, a user may want to watch and/or participate in an online game streamed to an endpoint device. The online game may include a video content component and an UI control component. The user may not notice that certain components, such as the video content components, are streamed at a lower resolution, while she would be able to notice that other components, such as UI control components, are streamed at the lower resolution. However, conventionally video content components and UI control components are rendered together to create one video stream, which is then encoded at one display resolution and transmitted to the endpoint device. This limitation results in the video content components being encoded at a higher resolution than is required for the user to enjoy a crisp display of content. As such, a large amount of network bandwidth is wasted, as well as computing resources and power used to process higher resolution content. One alternative to this problem is to encode the content stream to a lower resolution to save network bandwidth, computing resources and power costs. However, because the user can notice the low resolution of the UI control components, the user may not fully enjoy the gaming experience.

Additionally, UI control components may be updated and/or change less frequently than video content components. However, because video content components and UI control components are conventionally rendered together, the UI control components may be re-rendered unnecessarily in the creation of the combined UI video steam. This also results in a large amount of network bandwidth and/or computing resource being wasted.

Accordingly, implementations of the present disclosure provide for streaming the video content components separately from the UI control components and determining where and/or how to render the video content components and the UI control components. A server may make this determination based on at least one of: the hardware capability of the endpoint device, the maximum resolution of the endpoint device, the target resolution of the combined UI, the rendering capability of the server, and the bandwidth available to on the network. Based on these factors, the server may determine to render the video content components and the UI control components: (1) together at the server; (2) separately at the server, wherein the UI control components are encoded to a higher display resolution; or (3) separately, wherein the video content components are rendered at the server and the UI control components are rendered at the endpoint device.

Thus, the technical effect may include streaming the video content components and the UI control components separately and using appropriate resolutions so to allow the user to fully enjoy the content streaming experience. For example, if the user requests to stream an online game, the UI control component may be streamed using a higher resolution, giving the user a crisp display of the UI control components, while the video content components may be streamed using a lower resolution, which the user would not, or at least be less likely to, notice. By streaming the different components at the appropriate resolutions, less network bandwidth is required in streaming the content to the user and less computing resources and power are required in processing the rendered content. Thus, the compromise between resolution and demand on the network may be mitigated.

Bandwidth use is further reduced if UI control components are rendered on the endpoint device because transmitting a stream of commands to render the UI control commands at the endpoint device requires less bandwidth than transmitting the rendering of the UI control commands. In addition, bandwidth use is also reduced because changes to the UI control components will not need to be transmitted back and forth to the server, as would normally be required by the current technology. If the endpoint device contains the set of rendering commands, the endpoint device can make the determination as to how often to change the UI control components for the user on the device.

Figure 1:
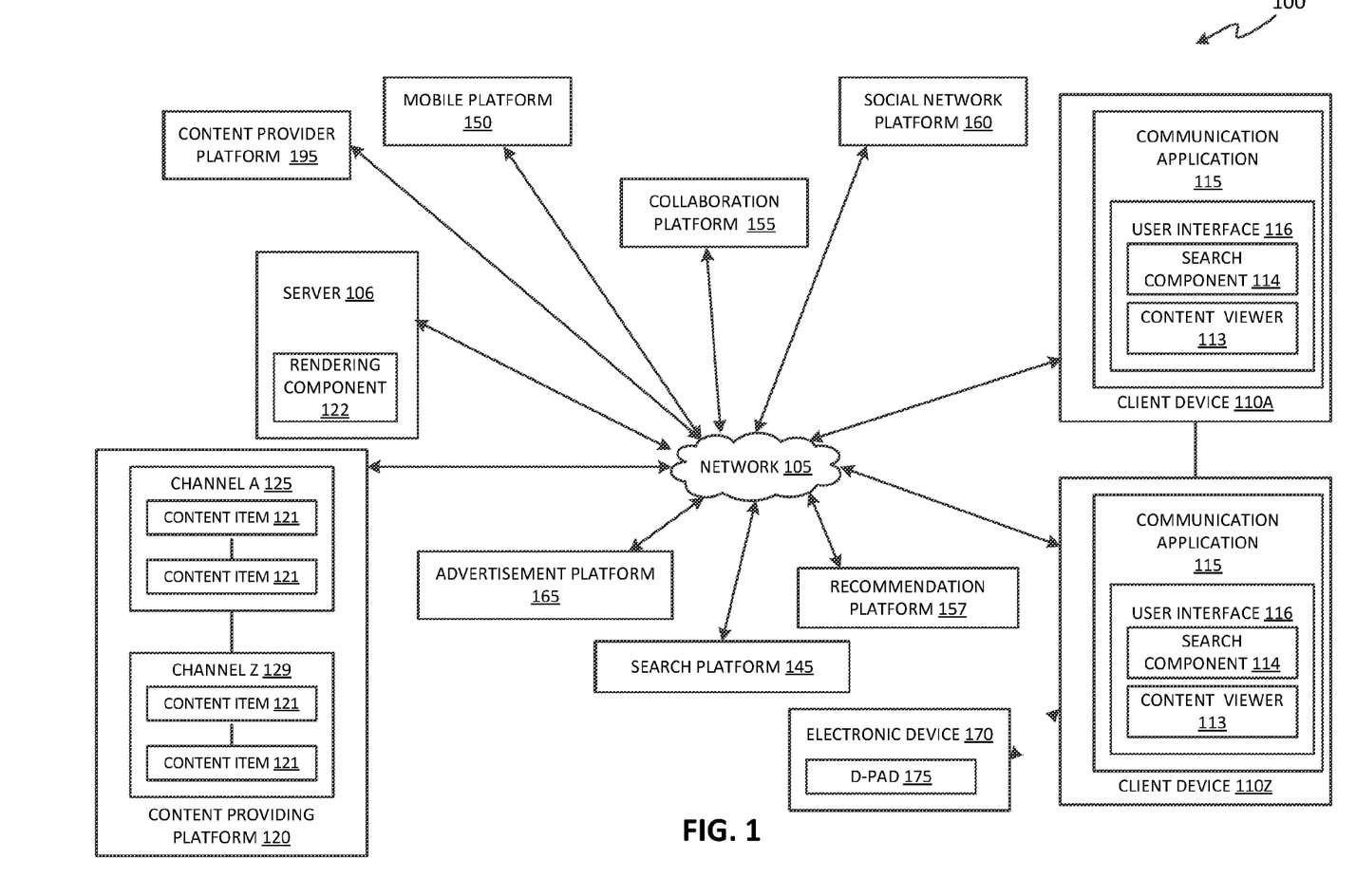
FIG. 1 illustrates an example of system architecture for providing a combined user interface with distinct components, in accordance with some aspects of the present disclosure.

FIG. 1 illustrates an example of system architecture 100 for providing a combined user interface with distinct components, in accordance with implementations of the disclosure. The system architecture 100 includes endpoint devices 110A through 110Z, one or more networks 105, one or more servers 106, one or more electronic devices 170, and one or more platforms (e.g., content sharing platform 120, recommendation platform 157, advertisement platform 165, mobile platform 150, social network platform 160, search platform 145, content provider platform 195, and collaboration platform 155). The platforms can include one or more computing devices (such as a rackmount server, a router computer, a server computer, a personal computer, a mainframe computer, a laptop computer, a tablet computer, a desktop computer, etc.) and one or more data stores (e.g., hard disks, memories, and databases) and may be coupled to one or more networks 105.

The one or more networks 105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 105.

The one or more data stores (not shown) can reside in memory (e.g., random access memory), cache, drives (e.g., hard drive), flash drives, etc. and can be part of one or more database systems, one or more file systems or another type of component or device capable of storing data. The one or more data stores can include multiple storage components (e.g., multiple drives or multiple databases) that may also span multiple computing devices (e.g., multiple server computers). The data store can be persistent storage that is capable of storing data. A persistent storage can be a local storage unit or a remote storage unit, electronic storage units (main memory), or similar storage unit. Persistent storage can be a monolithic device or a distributed set of devices. A 'set', as used herein, refers to any positive whole number of items.

Content items 121 (e.g., media content items) may be stored on one or more data stores. The data stores can be part of one or more platforms. Examples of a content item 121 can include, and are not limited to, digital video, digital movies, animated images, digital photos, digital music, digital audio, digital video games, collaborative media content presentations, website content, social media updates, electronic books (ebooks), electronic magazines, digital newspapers, digital audio books, electronic journals, web blogs, real simple syndication (RSS) feeds, electronic comic books, software applications, etc. Content 121 is also referred to as a media item. The content items 121 may be pre-recorded or live-streaming. For brevity and simplicity, an online video game (also hereinafter referred to as a game) may be used as an example of a content item 121 throughout this document.

The content items 121 can be provided by content providers. A content provider can be a user, a company, an organization, etc. A content provider can provide content items 121 that are video games. For example, a content item 121 may be a video game provided by a game publisher. In another example, a content item 121 may be a collaborative media content presentation provided by a media content provider.

The endpoint devices 110A-110Z can include devices, such as, televisions, smart phones, cellular telephones, personal digital assistants (PDAs), portable media players, netbooks, laptop computers, electronic book readers, tablet computers, desktop computers, set-top boxes, gaming consoles, and the like.

The individual endpoint devices 110A-110Z can include a communication application 115. A content item 121 can be consumed via the communication application 115, the Internet, etc. As used herein, "media," "media item," "online media item," "digital media," "digital media item," "content," "media content item," and "content item" can include an electronic file that can be executed or loaded using software, firmware or hardware configured to present a content item. In one implementation, the communication applications 115 may be applications that allow users to compose, send, and receive content items 121 (e.g., games) over a platform (e.g., content sharing platform 120, recommendation platform 157, advertisement platform 165, mobile platform 150, social network platform 160, search platform 145, collaboration platform 155, and content provider platform 195) and/or a combination of platforms and/or networks.

For example, the communication application 115 may be a social networking application, video sharing application, video streaming application, video game streaming application, video on demand application, photo sharing application, chat application, mobile application of a content provider, or any combination of such applications. The communication application 115 in an endpoint device 110A-110Z can render, display, and/or present one or more content items 121 (e.g., games) to one or more users. For example, the communication application 115 can provide one or more user interfaces (e.g., graphical user interfaces) to be displayed on an endpoint device 110A-110Z for receiving, and/or playing video content.

In one implementation, the communication application 115 may include a search component 114 and a content viewer 113 and may provide a user interface 116 that may be used to search for media content items via a virtual keyboard and that may play content items 121 in a content viewer 113 portion of the user interface 116. The content viewer 113 may render, display, and/or present content items 121 (e.g., video games) to one or more users. In one implementation, the content viewer 113 is embedded in an application (e.g., communication application 115). In another implementation, the content viewer 113 may be a standalone application (e.g., mobile application, desktop application, gaming console application, television application, etc.), such as communication application 115, that allows users to consume (e.g., play, display) content items 121, such as videos, images, documents (e.g., web pages), etc. For example, the content viewer 113 may be a web browser that can access, retrieve, present, and/or navigate content (e.g., web pages such as Hyper Text Markup Language (HTML) pages, digital media items, etc.) served by a web server of a platform. In another example, the content viewer 113 may display an embedded media player (e.g., a Flash® player or an HTML5 player) that is embedded in a document (e.g., user interface 116 (a web page)).

The content viewer 113 can be provided to the endpoint devices 110A-110Z by a server and/or a platform. For example, the content viewers 113 may be embedded media players that are embedded in user interfaces 116 (e.g., documents (web pages) or screens of a stand-alone application) provided by the content sharing platform 120 or the content provider platform 195. In another example, the content viewers 113 may be applications that are downloaded from a platform (e.g., content sharing platform 120, recommendation platform 157, advertisement platform 165, mobile platform 150, social network platform 160, search platform 145, collaboration platform 155, and content provider platform 195). In another example, the content viewers 113 may be standalone applications that are pre-installed on the endpoint devices 110A-110Z.

The electronic device 170 may be any suitable electronic device capable of communicating directional key inputs to the endpoint device 110A-110Z. For example, the electronic device 170 may include a remote controller, a gaming controller, a smart phone, a tablet, or the like. The electronic device 170 may include a physical or virtual directional pad ("D-pad") 175 that includes keys corresponding to up, down, left, right, and enter (select). The electronic device 170 may receive key input selections when the user presses one or more of the keys or the directional pad 175. The electronic device 170 may transmit the key inputs to the endpoint device 110A-110Z for processing by one or more processors running the search component 114.

In some embodiments, the endpoint device 110A-110Z can include one or more data stores. In this example, the data store(s) may include commands to render a combined UI. The commands can include instructions to render a video content component and a UI control component. In one implementation, the commands may include instructions to render a UI control component and the video content component may be rendered elsewhere (e.g., through a third party). The commands to render a UI control component may include an explicit indication that the commands are to render a UI control component. A developer and/or publisher may explicitly indicate that the commands are to render a UI control component when creating the commands.

One or more servers 106 may include computing devices such as a rackmount server, a router computer, a server computer, a personal computer, a mainframe computer, a laptop computer, a tablet computer, a desktop computer, etc. and may be coupled to one or more networks 105. The one or more servers 106 may be independent devices or part of any of the platforms (e.g., content sharing platform 120, recommendation platform 157, advertisement platform 165, mobile platform 150, social network platform 160, search platform 145, content provider platform 195, and collaboration platform 155). The server(s) 106 may include a rendering component 122. Rendering component 122 may determine where a UI control component is to be rendered for presentation to a user on endpoint device 110A-110Z. A user accessing a content item on an endpoint device 110A-110Z may transmit a request to access the content item. The request may include information regarding the capabilities of the endpoint device. For example, the request may include information regarding the endpoint device's ability to display one or more video streams and/or information regarding the maximum resolution that a content item presented to a user may be encoded to. Rendering component 122 may analyze the information included in the request and determine whether to generate a rendering of the UI control components at the server 106 or at the endpoint device 110A-110Z. If the rendering component 122 determines to render the UI control components at the server 106, the rendering component 122 may further determine whether to render the UI control components with a rendering of a video content component, or separate from the rendering of the video content component.

The content provider platform 195 can provide a service of a service provider. For example, a content provider may be a video game streaming service provider that produces an online video game via a communication application for users to interact with the online video game on endpoint devices 110A-110Z via the content provider platform 195. In another example, a content provider may be a video streaming service provider that produces a media streaming service via a communication application 115 for users to play videos, TV shows, video clips, audio, audio clips, and movies, on endpoint devices 110A-110Z via the content provider platform 195.

The social network platform 160 can provide an online social networking service. The social networking platform 160 can provide a communication application 115 for users to create profiles and perform activity with their profile. Activity can include updating a profile, exchanging messages with other users, evaluating (e.g., like, comment, share, recommend) status updates, photos, videos, etc., and receiving notifications of other users activity.

The mobile platform 150 can be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephone communication, Short Message Service (SMS) messaging, Multimedia Message Service (MMS) messaging, text chat, and/or any other communication between users. The mobile platform 150 can support user communications via video messaging, video chat, and/or videoconferences.

The collaboration platform 155 can enable collaboration services, such as video chat, video messaging, and audio and/or videoconferences (e.g., among the users of devices 110A-110Z) using, for example, streaming video or voice over IP (VoIP) technologies, cellular technologies, LAN and/or WAN technologies, and may be used for personal entertainment, business, educational, or academically oriented interactions.

The recommendation platform 157 can be used to generate and provide content recommendations (e.g., articles, videos, posts, news, games, etc.).

The search platform 145 can be used to allow users to query the one or more data stores 106 and/or one or more platforms and receive query results.

The advertisement platform 165 can be used provide video advertisements.

The content sharing platform 120 can be used to provide one or more uses with access to content items 121 and/or provide the content items 121 to one or more users. For example, the content sharing platform 120 may allow users to consume, upload, download, and/or search for content items 121. In another example, the content sharing platform 120 may allow users to evaluate content items 121, such as, approve of ("like"), disapprove of ("dislike"), recommend, share, rate, and/or comment on content items 121. In another example, the content sharing platform 120 may allow users to edit content items 121. The content sharing platform can also include a website (e.g., one or more webpages) and/or one or more applications (e.g., communication applications 115) that may be used to provide one or more users with access to the content items 121, for example, via endpoint devices 110A-110Z. Content sharing platform 120 can include any type of content delivery network providing access to content items 121.

The content sharing platform 120 can include multiple channels (e.g., Channel A 125 through Channel Z 129). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 125 may include videos Y and Z. A channel can be associated with an owner, who is a user that can perform actions on the channel. The data content can be one or more content items 121. The data content in the channels can be pre-recorded or live-streaming. Although channels are described as one implementation of a content sharing platform, implementations of the disclosure are not limited to content sharing platforms that provide content items 121 via a channel model.

Figure 2:
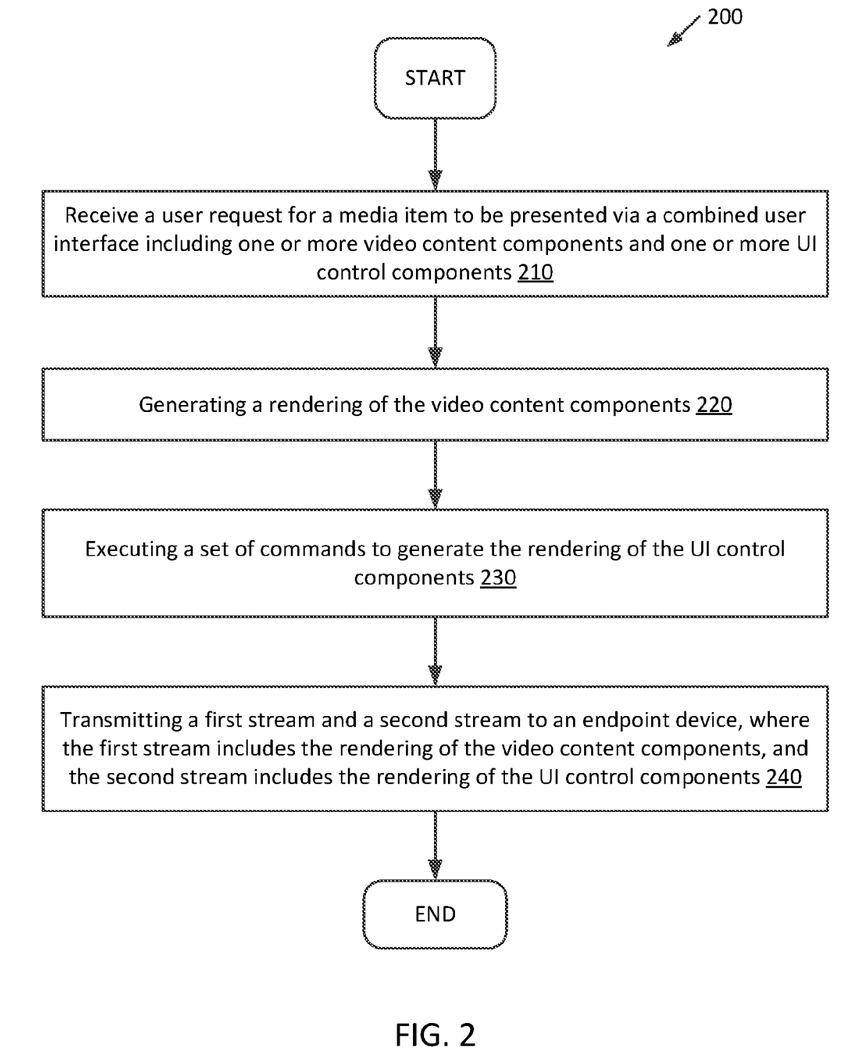
FIG. 2 illustrates a flow diagram of an example method for providing a combined user interface to an endpoint device, in accordance with some aspects of the present disclosure.
Figure 3:
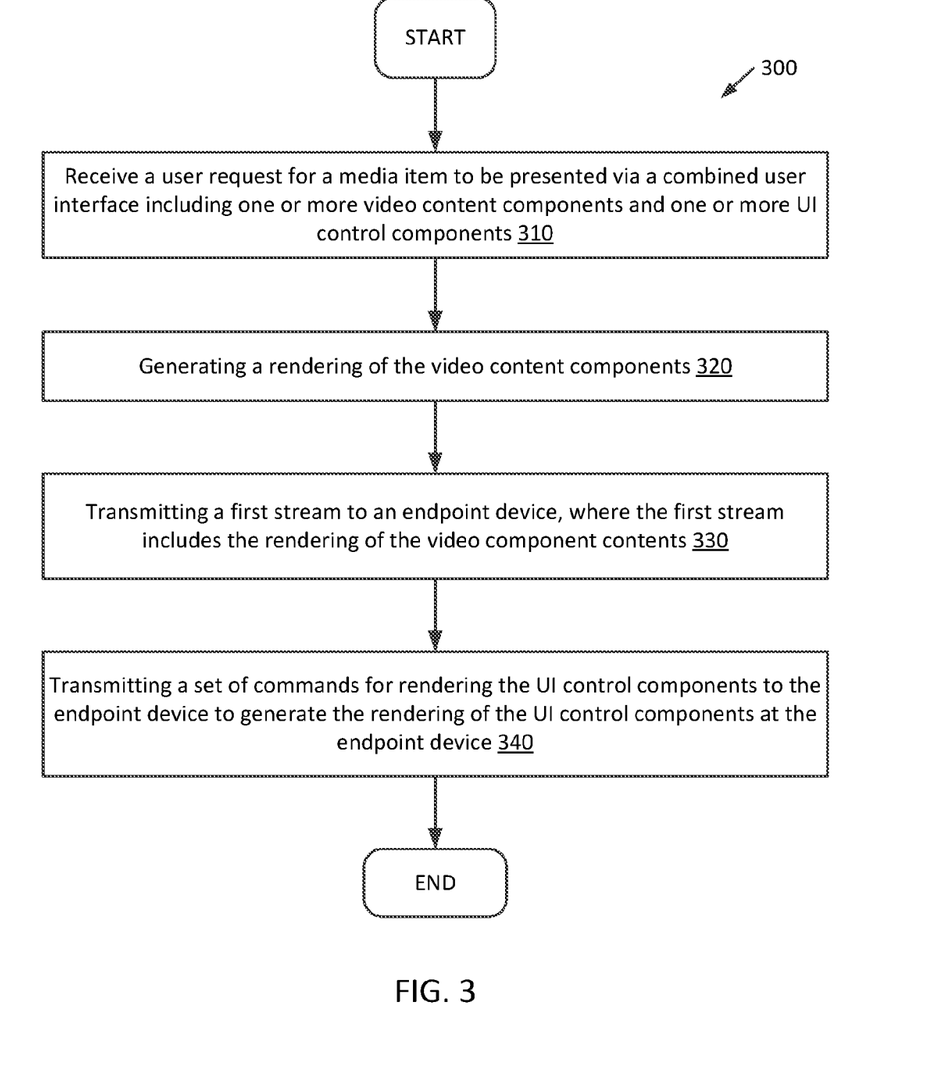
FIG. 3 illustrates a flow diagram of another example method for providing a combined user interface to an endpoint device, in accordance with some aspects of the present disclosure.
Figure 4:
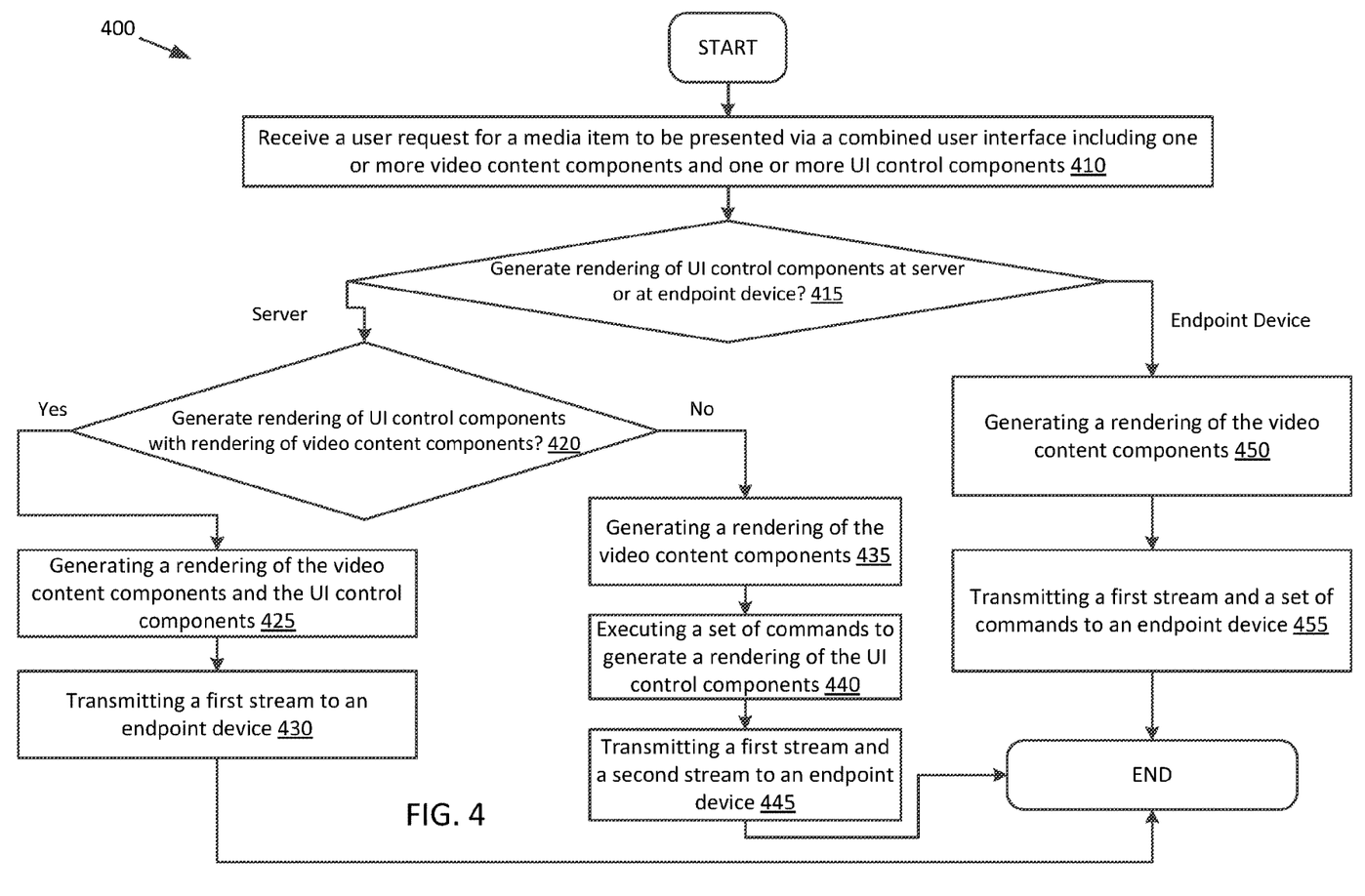
FIG. 4 illustrates a flow diagram of yet another example r method for providing a combined user interface to an endpoint device, in accordance with some aspects of the present disclosure.

FIGS. 2-4 illustrate example methods that provide a combined user interface to an endpoint device in accordance with various aspects of the present disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in prior figures can be and are intended to be implementable in accordance with the following methods.

The methods can be performed by processing logic that may include hardware (circuitry, dedicated logic, etc.), software (e.g., instructions run on a processing device), or a combination thereof. In some embodiments, some or all the operations of the methods may be performed by server(s) 106 of FIG. 1.

Referring to FIG. 2, a flow diagram illustrates an example method 200 for providing a combined user interface to an endpoint device, in accordance with some aspects of the present disclosure. At block 210, a user request can be received for a media item to be presented via a user interface. The user request may include information regarding the endpoint device on which the media item is to be presented. In one implementation, the user request may include information regarding the capabilities of the endpoint device. For example, the user request may include information regarding the endpoint device's ability to display one or more video streams. The user request may further include information regarding the maximum resolution that can be used to encode a media item to be presented to a user, as supported by the endpoint device.

In response to the user request for the media item to be presented via the user interface, the server may determine that the user interface is a combined user interface that includes one or more video content components and one or more UI control components. The video content component(s) can provide playback of a video (e.g., a live video, a previously uploaded video, a 3D video, etc.). The UI control component(s) can present information about the video (e.g., the title of the video, a sub-title of a currently played portion of the video, a commentary for a currently played portion of the video, etc.), and allow the user to provide input pertaining to the video (e.g., to enter data that can result in a change of content for one or more subsequent portions of the video or a change in a sequence of playback of one or more subsequent portions of the video, to request information about the currently played portion of the video such as information about a relevant geographic location or information about depicted characters or objects, etc.). In one implementation, the requested media item may be an online game to be streamed to an endpoint device. In such an implementation, the video content component(s) may include a gameplay component (also referred to as a game world component) and the UI control components may include game UI components that present information about the game or characters in the game (e.g., the title of the game, a sub-title of a currently played portion of the game, a commentary for a currently played portion of the game, etc.) and allow the user to provide input pertaining to the game (e.g., to enter data that can result in a change of characters or actions for one or more subsequent portions of the game or a change in a sequence of subsequent gameplay, to request information about the currently played portion of the gameplay such as information about a relevant geographic location or information about depicted characters or objects, etc.).

Upon determining that the user interface is a combined user interface that includes the video content component(s) and the UI control component(s), the server may generate a rendering of the video content component(s) separately from a rendering of the UI control component(s). The server may do so for each requested media item that should be presented via a combined user interface or alternatively, the sever may make a determination on whether to do so (e.g., based on the information included in the request, as will be discussed in more detail below in conjunction with FIG. 4).

At block 220, the rendering of the video content component(s) may be generated. The rendering of the video content component(s) may be generated using a mechanism for rendering graphics. In one implementation, the rendering of the video content component(s) may be generated be performing operations in a graphics rendering pipeline on a graphics processing unit (GPU). In another implementation, the rendering of the video content component(s) may be generated by performing operations in a software rendering pipeline on a central processing unit (CPU) or graphics rendering unit (also referred to as a render output unit). In yet another implementation, the rendering of the video content component(s) may be initiated by invoking a graphics application programming interface (API) that communicates with an accelerator to generate the rendering.

In order to generate a rendering of the UI control component(s) of the combined UI, the server identifies a set of commands to render the UI control component(s). Such commands may be provided in advance (e.g., by a software developer or a video content publisher) and stored in a data store accessible by the server. At block 230, the above set of commands may be executed to generate the rendering of the UI control components. In one implementation, the set of commands to generate the rendering of the UI control components may be explicitly designated by a software developer when the combined UI is developed. In another implementation, the set of commands may be received from a third party and the third party may explicitly designate the set of commands as commands to generate the rendering of the UI control components. In yet another implementation, the set of commands may be composed of multiple sets of commands received from multiple third parties. In such an implementation, the third parties may explicitly indicate the set of commands as commands to generate a rendering of a portion of the UI control component(s).

At block 240, a first stream including the rendering of the video content component(s) and a second stream including the rendering of the UI control component(s) may be transmitted to an endpoint device. In one implementation, the first stream and the second stream may be encoded to different display resolutions. In particular, the second stream may be encoded to a higher display resolution than the first stream. For example, the second stream may be encoded to the maximum resolution supported by the endpoint device, and the first stream may be encoded to a resolution that is less than the maximum resolution supported by the endpoint device.

The endpoint device may receive the first stream and the second stream. The endpoint device may determine that the second stream is encoded to a higher resolution than the first stream and may use an upsampling technique on the first stream (e.g., by inserting zero-valued samples between original samples of the first stream to increase the sampling rate) to match the resolution of the second stream. The endpoint device may present the first stream and the second stream to the user. In one implementation, the endpoint device may present the second stream as overlaying the first stream so that the user is presented with the first stream and the second stream as one media item.

FIG. 3 illustrates a flow diagram of another sample method for providing a combined user interface to an endpoint device, in accordance with some aspects of the present disclosure. At block 310, a user request can be received for a media item to be presented via a user interface. Block 310 may be similar to block 210 of FIG. 2.

In response to the user request for the media item to be presented via the user interface, the server may determine that the user interface is a combined user interface that includes one or more video content components and one or more UI control components. Upon determining that the user interface is a combined user interface that includes the video content component(s) and the UI control component(s), the server may generate a rendering of the video content component(s) and may instruct an endpoint device to generate a rendering of the UI control component(s) (by providing a set of commands for rendering the UI control components to the endpoint device). The server may do so for each requested media item that should be presented via a combined user interface or alternatively, the sever may make a determination on whether to do so (e.g., based on the information included in the request, as will be discussed in more detail below in conjunction with FIG. 4).

At block 320, the rendering of the video content component(s) may be generated, as discussed in more detail above in conjunction with FIG. 2.

At block 330, a first stream including the rendering of the video content component(s) may be transmitted to the endpoint device. In one implementation, the first stream may be encoded to a resolution that is less than the maximum resolution supported by the endpoint device. Alternatively, the first stream may be encoded to the maximum resolution supported by the endpoint device.

At block 340, the set of commands may be transmitted to the endpoint device to render the UI control component(s) associated with the video content component(s) of the first video stream. In one implementation, the set of commands to generate the rendering of the UI control component(s) may be explicitly indicated by a developer when the combined UI is developed. In another implementation, the set of commands may be received from a third party and the third party may explicitly designate the set of commands as commands to generate the rendering of the UI control component(s). In yet another implementation, the set of commands may be composed of multiple sets of commands received from multiple third parties. In such an implementation, the third parties may explicitly indicate the set of commands as commands to generate a rendering of a portion of the UI control component(s).

In one implementation, a second set of commands for rendering the UI control component(s) may be generated based on the initial set of commands for rendering the UI control component(s). The second set of commands may include high level instructions for rendering the UI control component(s). For example, the second set of commands may include a high level instruction to render a UI control component, while the initial set of commands may include specific instructions with information needed to actually render the UI control component. In one implementation, the second set of commands may be transmitted to the endpoint device in place of the initial set of commands. Using the second set of commands, the endpoint device can determine what type of UI control should be included in the UI and can use locally stored instructions for this specific type of UI control to generate the rendering.

The endpoint device may receive the first stream and the set of commands for generating the rendering of the UI control component(s). The endpoint device may execute the received set of commands and generate the rendering of the UI control component(s). In one implementation, the endpoint device may use an upsampling technique for the first stream to match the maximum resolution of the endpoint device. Alternatively, the first stream may be encoded to the same resolution that is used for rendering the UI control component(s), which would still be advantages in terms of bandwidth use because transmitting the commands requires less bandwidth and computing resources than transmitting the rendering of the UI control component(s).

The endpoint device may present the first stream and the rendering of the UI control components to a user. For example, the endpoint device may present the rendering of the UI control components as overlaying the first stream so that the user is presented with the first stream and the UI control components as one media item.

FIG. 4 illustrates a flow diagram of yet another sample method for providing a combined user interface to an endpoint device, in accordance with some aspects of the present disclosure. At block 410, a user request may be received for a media item to be presented via a combined user interface. The combined user interface may include one or more video content components, and one or more UI control components. In one implementation, the requested media item may be a game to be streamed to an endpoint device. In such an implementation, the video content component(s) may include the game component(s) (also referred to as the game world component(s) and the UI control component(s) may include the game UI component(s). In one implementation, user input may be received via the UI control component(s).

The user request may include information regarding the endpoint device on which the media item is to be presented. In one implementation, the user request may include information regarding the capabilities of the endpoint device. For example, the user request may include information regarding the endpoint device's ability to display one or more video streams. The user request may further include information regarding the maximum resolution that a media item presented to a user may be encoded to.

At block 415, it may be determined whether to generate a rendering of the UI control component(s) at the server (e.g., at a platform described with reference to FIG. 1) or at an endpoint device. In one implementation, the determination of whether to generate the rendering of the UI control component(s) may be based on at least one of: a hardware capability of the endpoint device, a resolution of the endpoint device, a target resolution of the combined UI, a rendering capability of the server, or a bandwidth available on the network (e.g., network 105 of FIG. 1).

In one implementation, it may be determined whether to generate a rendering of the UI control component(s) at the server. For example, if the endpoint device has low processing capability, it may be determined to generate a rendering of the UI control components at the server. If it is determined to generate a rendering of the UI control components at the server, the method 400 may continue to block 420.

At block 420, it may be determined whether to generate the rendering of the UI control component(s) with the rendering of the video content component(s). In one implementation, it may be determined to generate a rendering of the UI control component(s) with the rendering of the video content component(s). For example, if the endpoint device is capable of displaying one video stream to a use at a time, it may be determined to generate the rendering of the UI control component(s) with the rendering of the video content component(s). In another example, if the endpoint device has a low maximum resolution, it may be determined to generate the rendering of the UI control component(s) with the rendering of the video content component(s).

If it is determined to generate a rendering of the UI control component(s) with the rendering of the video content component(s), the method 400 may continue to block 425. At block 425, a rendering of the video content component(s) and the UI control component(s) may be generated as a rendering of a combined UI. In one implementation, the rendering of the combined UI may be generated through any method used to render graphics, as discussed above with reference to FIG. 2. In another implementation, the rendering of the combined UI may be generated by operations performed in a graphics rendering pipeline on a GPU, as discussed above with reference to FIG. 2. In yet another implementation, the rendering of the combined UI may be generated by operations performed in a software rendering pipeline on a CPU or graphics rendering unit, as discussed above with reference to FIG. 2. In still another implementation, the combined UI may be rendered using a graphics API, as discussed above with reference to FIG. 2.

At block 430, a first stream may be transmitted to the endpoint device. The first stream may contain a rendering of the combined UI generated at block 425. The endpoint device may present the first stream to the user.

In one implementation, it may be determined to generate a rendering of UI control component(s) separately from the rendering of the video content component(s). For example, if the endpoint device is capable of displaying multiple video streams to a user at the same time, it may be determined to generate a rendering of the UI control component(s) separately from the rendering of the video control component(s). In another example, if there is not a large amount of network bandwidth to transmit a single stream including a rendering of the video content component(s) and the UI control components at a maximum resolution the endpoint device is capable of presenting, it may be determined to generate a rendering of the UI control component(s) separately from the rendering of the video control component(s).

If, at block 420, it is determined to generate a rendering of the UI control component(s) separately from the rendering of the video content component(s), the method 400 may continue to block 435. At block 435, a rendering of the video content component(s) may be generated, as discussed above with reference to FIG. 2. The rendering of the video content component(s) may be included in a first video stream. In one implementation, the first video stream may be encoded to a resolution that is less than the maximum resolution that the endpoint device is capable of presenting.

At block 440, a set of commands may be executed to generate a rendering of the UI control component(s), as discussed above with reference to FIG. 2.

The rendering of the UI control component(s) may be included in a second stream. In one implementation, the second stream may be encoded to the maximum resolution that the endpoint is capable of presenting. In one implementation, the second stream may be encoded to a resolution that is higher than the resolution of the first stream.

At block 445, the first stream and the second stream may be transmitted to the endpoint device. The first stream may include the rendering of the video content component(s). The second stream may include the rendering of the UI control component(s).

The endpoint device may receive the first stream and the second stream. The endpoint device may determine that the second stream is encoded to a higher display resolution than the first stream. In one implementation, the endpoint device may use an upsampling technique for the first stream to match the resolution of the second stream. The endpoint device may present the first stream and the second stream to the user. In one implementation, the endpoint device may present the second stream as overlaying the first stream so that the user is presented the first stream and the second stream as one media item.

In one implementation, it may be determined to generate the rendering of the UI control component(s) at the endpoint device. For example, if the endpoint device has a high processing capability, it may be determined to generate the rendering of the UI control component(s) at the endpoint device.

If, at block 415, it is determined to generate the rendering of the UI control component(s) at the endpoint device, the method 400 may continue to block 450. At block 450, a rendering of the video content component(s) may be generated, as discussed above with reference to FIG. 2. The rendering of the video content component(s) may be included in a first stream. In one implementation, the first stream may be encoded to a resolution that is less than the maximum resolution that the endpoint device is capable of presenting. In another implementation, the first stream may be encoded to the maximum resolution that the endpoint device is capable of presenting.

In one implementation, a second set of commands for rendering the UI control component(s) may be generated based on the initial set of commands for rendering the UI control components. The second set of commands may include high level instructions for rendering the UI control components, as discussed above with reference to FIG. 3. In one implementation, the second set of commands may be transmitted to the endpoint device in place of the initial set of commands.

At block 455, the first stream may be transmitted to the endpoint device. The first stream may include the rendering of the video content component(s). A set of commands may also be transmitted to the endpoint device for rendering, for example, at the maximum resolution supported by the endpoint device. The set of commands may be a set of commands to render the UI control component(s). In one implementation, the endpoint device may use an upsampling technique for the first stream to match the maximum resolution of the endpoint device. The endpoint device may present the first stream and the rendering of the UI control component(s) to a user. For example, the endpoint device may present the rendering of the UI control components as overlaying the first stream so that the user is presented with the first stream and the UI control components as one media item.

Figure 5:
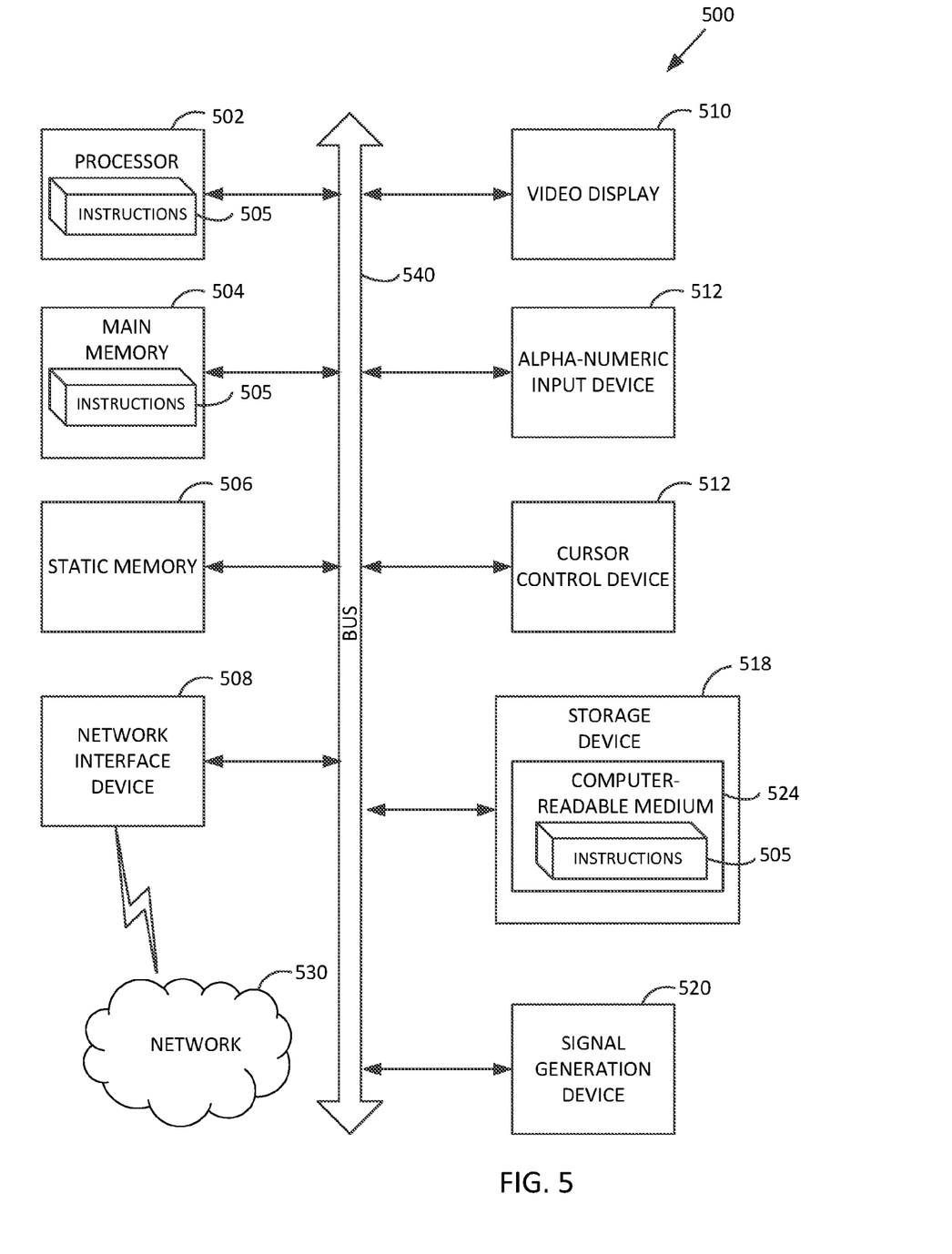
FIG. 5 illustrates an example block diagram of a computing device operating in accordance with one or more aspects of the present disclosure.

FIG. 5 illustrates an example block diagram of a computing device operating in accordance with one or more aspects of the preset disclosure. The computer system 600 can be server 106 or endpoint device 110A-110Z in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., of rendering component 122 or communication application 115) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., of rendering component 122 or communication application 115) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 630 via the network interface device 508.

In one implementation, the instructions 505 include instructions for rendering a video content component and/or a UI control component. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method comprising:
   receiving, at a server, a user request for a media item to be presented via a combined user interface (UI) including one or more video content components and one or more UI control components;
   generating a rendering of the video content components; and
   transmitting a first stream including the rendering of the video content components and a second stream including the rendering of the UI control components to an endpoint device, wherein the first stream is encoded to a first resolution and the second stream is encoded to a second resolution that is higher than the first resolution, and wherein the rendering of the video content components is to be merged with a rendering of the UI control components into the combined UI at the endpoint device, the combined UI having the second resolution.

2. The method of claim 1, further comprising:
   executing, at the server, a set of commands to generate the rendering of the UI control components.

3. The method of claim 1, further comprising:
   determining whether to generate a rendering of the UI control components at the server or at the endpoint device; and
   responsive to determining to generate the rendering of the UI control components at the server:
      executing, at the server, a set of commands for rendering the UI control components to generate the rendering of the UI control components.

4. The method of claim 3, wherein the second resolution is higher than the first resolution, and the rendering of the video content components is to be modified to match the second resolution of the UI control components at the endpoint device.

5. The method of claim 3, wherein the determination of whether to execute the set of commands at the server or at the endpoint device is based on at least one of: a hardware capability of the endpoint device, a resolution of the endpoint device, a target resolution of the combined UI, a rendering capability of the server, or a bandwidth available on a network.

6. The method of claim 1, wherein the combined UI is to present an online game that receives user input via the UI control components.

7. A system comprising:
   a memory; and
   a processing device coupled to the memory, the processing device to:
      receive a user request for a media item to be presented via a combined user interface (UI) including one or more video content components and one or more UI control components;
      generate a rendering of the video content components; and
      transmit a first stream including the rendering of the video content components and a second stream including the rendering of the UI control components to an endpoint device, wherein the first stream is encoded to a first resolution and the second stream is encoded to a second resolution that is higher than the first resolution, and wherein the rendering of the video content components is to be merged with a rendering of the UI control components into the combined UI at the endpoint device, the combined UI having the second resolution.

8. The system of claim 7, wherein the processing device is further to:
execute a set of commands to generate the rendering of the UI control components.

9. The system of claim 7, wherein the processing device is further to:
determine whether to generate a rendering of the UI control components at a server or at the endpoint device; and
responsive to determining to generate the rendering of the UI control components at the server:
execute a set of commands for rendering the UI control components to generate the rendering of the UI control components.

10. The system of claim 9, wherein the second resolution is higher than the first resolution, and the rendering of the video content components is to be modified to match the second resolution of the UI control components at the endpoint device.

11. The system of claim 9, wherein the determination of whether to execute the set of commands at the server or at the endpoint device is based on at least one of: a hardware capability of the endpoint device, a resolution of the endpoint device, a target resolution of the combined UI, a rendering capability of the server, or a bandwidth available on a network.

12. The system of claim 7, wherein the combined UI is to present an online game that receives user input via the UI control components.

13. A non-transitory computer readable storage medium including instructions that, when executed by a processing device, cause the processing device to perform operations comprising:
receiving, at a server, a user request for a media item to be presented via a combined user interface (UI) including one or more video content components and one or more UI control components;
generating a rendering of the video content components; and
transmitting a first stream including the rendering of the video content components and a second stream including the rendering of the UI control components to an endpoint device, wherein the first stream is encoded to a first resolution and the second stream is encoded to a second resolution that is higher than the first resolution and wherein the rendering of the video content components is to be merged with a rendering of the UI control components into the combined UI at the endpoint device, the combined UI having the second resolution.

14. The non-transitory computer readable storage medium of claim 13, the operations further comprising:
executing, at the server, a set of commands to generate the rendering of the UI control components.

15. The non-transitory computer readable storage medium of claim 13, the operations further comprising:
determining whether to generate a rendering of the UI control components at the server or at the endpoint device; and
responsive to determining to generate the rendering of the UI control components at the server:
executing, at the server, a set of commands for rendering the UI control components to generate the rendering of the UI control components.

16. The non-transitory computer readable storage medium of claim 15, wherein the second resolution is higher than the first resolution, and the rendering of the video content components is to be modified to match the second resolution of the UI control components at the endpoint device.

17. The non-transitory computer readable storage medium of claim 15, wherein the determination of whether to execute the set of commands at the server or at the endpoint device is based on at least one of: a hardware capability of the endpoint device, a resolution of the endpoint device, a target resolution of the combined UI, a rendering capability of the server, or a bandwidth available on a network.

* * * * *